US008346701B2

(12) United States Patent
Wang et al.

(10) Patent No.: US 8,346,701 B2
(45) Date of Patent: Jan. 1, 2013

(54) ANSWER RANKING IN COMMUNITY QUESTION-ANSWERING SITES

(75) Inventors: Xin-Jing Wang, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 12/358,517

(22) Filed: Jan. 23, 2009

(65) Prior Publication Data
US 2010/0191686 A1    Jul. 29, 2010

(51) Int. Cl.
G06F 17/00 (2006.01)
G06N 5/02 (2006.01)
(52) U.S. Cl. .................................................. 706/46
(58) Field of Classification Search .............. 706/46, 706/48, 50, 54, 59, 62
See application file for complete search history.

(56) References Cited

U.S. PATENT DOCUMENTS

| 5,321,833 | A  | 6/1994  | Chang et al. |
| 7,146,361 | B2 | 12/2006 | Broder et al. |
| 7,437,382 | B2 | 10/2008 | Zhang et al. |
| 2006/0026152 | A1 | 2/2006 | Zeng et al. |
| 2008/0235208 | A1 | 9/2008 | Rouhani-Kalleh |

OTHER PUBLICATIONS

Shen et al, "Data Mining and Case-Based Reasoning for Distance Learning", Journal of Distance Education Technologies, 1(3), 46-58, Jul.-Sep. 2003.*

Ackerman, et al., "Answer Garden 2: Merging Organizational Memory with Collaborative Help", retrieved on Dec. 1, 2008 at <<http://www.eecs.umich.edu/~ackerm/pub/96b22/cscw96.ag2. pdf>>, ACM Conference on Computer-Supported Cooperative Work, CSCW, 1996, 11 pages.

Agichtein, et al., "Finding High-Quality Content in Social Media", retrieved on Dec. 1, 2008 at <<http://www.mathcs.emory.edu/~eugene/papers/wsdm2008quality.pdf>>, WSDM 2008, Feb. 11-12, 2008, Palo Alto, California, 2008, 11 pages.

Berger, et al., "Bridging the Lexical Chasm: Statistical Approaches to Answer-Finding", Proceedings of the 23rd annual international ACM SIGIR conference on Research and development in information retrieval, Athens, Greece, 2000, pp. 192-199.

Berger, et al., "Information Retrieval as Statistical Translation", retrieved on Dec. 1, 2008 at <<http://delivery.acm.org/10.1145/320000/312681/p222-berger.pdf?key1=312681&key2=7942028221&coll=GUIDE&dl=&CFID=12984206&CFTOKEN=62322542>>, SIGIR 1999, Aug. 1999, Berkley, California, ACM, 1999, pp. 222-229.

Bian, et al., "A Few Bad Votes Too Many? Towards Robust Ranking in Social Media", retrieved on Dec. 1, 2008 at <<http://www.mathcs.emory.edu/~eugene/papers/airweb2008_spam.pdf>>, AIRWeb 2008, Apr. 22, 2008, Beijing, China, 2008, 8 pages.

(Continued)

Primary Examiner — David R Vincent
Assistant Examiner — Ilya Traktovenko
(74) Attorney, Agent, or Firm — Lee & Hayes, PLLC

(57) ABSTRACT

In some implementations, a plurality of first questions and corresponding first answers are identified at a community question-answer (CQA) site as a plurality of first question-answer (q-a) pairs. A query thread comprised of a second question and a plurality of candidate second answers is selected for making a determination of answer quality. A set of the first questions that are similar to the second question are identified from the plurality of first questions. First linking features between the identified set of first questions and their corresponding first answers are used for determining an analogy with second linking features between the second question and candidate answers for ranking the candidate answers.

20 Claims, 8 Drawing Sheets

OTHER PUBLICATIONS

Bian, et al., "Finding the Right Facts in the Crowd: Factoid Question Answering over Social Media", retrieved on Dec. 1, 2008 at <<http://delivery.acm.org/10.1145/1370000/1367561/p467-bian.pdf?key1=1367561&key2=6142028221&coll=GUIDE&dl=GUIDE&CFID=12984039&CFTOKEN=19115590>>, WWW 2008, Apr. 21-25, 2008, Beijing, China, pp. 467-476.

Bilotti, et al., "Structured Retrieval for Question Answering", retrieved on Dec. 1, 2008 at <<http://www.cs.cmu.edu/~mbilotti/pubs/Bilotti:SIGIR07.pdf>>, SIGIR 2007, Jul. 23-27, 2007, Amsterdam, The Netherlands, 2007, pp. 351-358.

Blei, et al., "Modeling Annotated Data", retrieved on Dec. 1, 2008 at <<http://delivery.acm.org/10.1145/870000/860460/p127-blei.pdf?key1=860460&key2=3332028221&coll=GUIDE&dl=GUIDE&CFID=13519954&CFTOKEN=19668346>>, Proceedings of the 26th annual international ACM SIGIR conference on Research and developing in information retrieval, 2003, pp. 127-134.

Blooma, et al., "A Predictive Framework for Retrieving the Best Answer", retrieved on Dec. 1, 2008 at <<http://delivery.acm.org/10.1145/1370000/1363944/p1107-blooma.pdf?key1=1363944&key2=3822028221&coll=GUIDE&dl=GUIDE&CFID=12983919&CFTOKEN=94944765>>, SAC 2008, Mar. 16-20, 2008, Fortaleza, Ceara, Brazil, 2008, pp. 1107-1111.

Blooma, et al., "Towards a Hierarchical Framework for Predicting the Best Answer in a Question Answering System", retrieved on Dec. 1, 2008 at <<http://www.springerlink.com/content/3815g4153n414160/fulltext.pdf>>, ICADL 2007, LNCS 4822, Springer-Verlag Berlin Heidelberg, 2007, pp. 497-498.

Brill, et al., "Data-Intensive Question Answering", retrieved on Dec. 1, 2008 at <<http://research.microsoft.com/~sdumais/Trec2001Notebook.Feb2002Final.pdf>>, 8 pages.

Chu-Carroll, et al., "In Question Answering, Two Heads Are Better Than One", Proceedings of HLT-NAACL 2003, Edmonton, May-Jun. 2003, pp. 24-31.

Dumais, et al. "Web Question Answering: Is More Always Better?", SIGIR 2002, Aug. 11-15, 2002, Tampere, Finland, 2002, 9 pages.

French, "The Computational Modeling of Analogy-making", retrieved on Dec. 1, 2008 at <<http://www.u-bourgogne.fr/LEAD/people/french/analogy.tics.pdf>>, pp. 1-12.

Getoor, et al., "Learning Probablistic Relational Models", 2001, pp. 7-35.

Getoor, et al., "Learning Probabilistic Models of Link Structure", retrieved on Dec. 1, 2008 at <<http://www.seas.upenn.edu/~taskar/pubs/jmlr02.pdf>>, 2002, pp. 679-707.

Ghahramani, et al., "Bayesian Sets", retrieved on Dec. 1, 2008 at <<http://www.gatsby.ucl.ac.uk/~heller/bsets.pdf>>, 8 pages.

Gyongyi, et al., "Questioning Yahoo! Answers", retrieved on Dec. 1, 2008 at <<http://www.stanford.edu/~koutrika/res/Publications/2008qaweb.pdf>>, QAWeb, Beijing, China, 2008, 8 pages.

Halevy, "Answering Queries Using Views: A Survey", retrieved on Dec. 1, 2008 at <<www.cs.washington.edu/homes/alon/site/files/view-survey.ps>>, pp. 1-36.

Harper, et al., "Predictors of Answer Quality in Online Q&A Sites", retrieved on Dec. 1, 2008 at <<http://delivery.acm.org/10.1145/1360000/1357191/p865-harper.pdf?key1=1357191&key2=3422028221&coll=GUIDE&dl=GUIDE&CFID=13519780&CFTOKEN=76966347>>, CHI 2008, Apr. 5-10, 2008, Florence, Italy, 2008, pp. 865-874.

Hofmann, "Probabilistic Laten Semantic Analysis", retrieved on Dec. 1, 2008 at <<http://www.cs.brown.edu/~th/papers/Hofmann-UAI99.pdf>>, Uncertainty in Artificial Intelligence, UAI 1999, Stockholm, 1999, 8 pages.

Ittycheriah, et al., "IBM's Statistical Question Answering System—TREC-11", retrieved on Dec. 1, 2008 at <<http://trec.nist.gov/pubs/trec11/papers/ibm.ittycheriah.pdf>>, pp. 1-8.

Jeon, "A Framework to Predict the Quality of Answers with Non-Textual Features", retrieved on Dec. 1, 2008 at <<http://ciir.cs.umass.edu/personnel/IR-469.pdf>>, SIGIR 2006, Aug. 6-10, 2006, Seattle, Washington, 2006, 8 pages.

Jeon, et al., "Finding Similar Questions in Large Question and Answer Archives", retrieved on Dec. 1, 2008 at <<http://ciir.cs.umass.edu/pubfiles/ir-442.pdf>>, CIKM 2005, Oct. 31-Nov. 5, 2005, Bremem, Germany, 2005, 7 pages.

Jijkoun, et al., "The University of Amsterdam at CLEF@QA 2006", retrieved on Dec. 1, 2008 at <<http://www.clef-campaign.org/2006/working_notes/workingnotes2006/jijkounCLEF2006.pdf>>, 13 pages.

Jurczyk, "Discovering Authorities in Question Answer Communities by using Link Analysis", retrieved on Dec. 1, 2008 at <<http://www.mathcs.emory.edu/~pjurczy/cikm542s-jurczyk.pdf>>, CIKM 2007, Nov. 6-8, 2007, Lisboa, Portugal, 2007, 4 pages.

Kleinberg, Authoritative Sources in a Hyperlinked Environment, retrieved on Dec. 1, 2008 at <<http://delivery.acm.org/10.1145/330000/324140/p604-kleinberg.pdf?key1=324140&key2=4022028221&coll=GUIDE&dl=GUIDE&CFID=12983768&CFTOKEN=60223710>>, Journal of the ACM, vol. 46, No. 5, Sep. 1999, pp. 604-632.

Ko, et al., "A Probabilistic Graphical Model for Joint Answer Ranking in Question Answering", retrieved on Dec. 1, 2008 at <<http://www.cs.cmu.edu/~jko/paper/HLT07.pdf>>, 8 pages.

Ko, et al., "A Probabilistic Graphical Model for Joint Answer Ranking in Question Answering", retrieved on Dec. 1, 2008 at <<http://www.cs.purdue.edu/homes/lsi/Sigir07_ko_si_nyberg.pdf>>, SIGIR 2007, Jul. 23-27, 2007, Amsterdam, The Netherlands, 2007, 8 pages.

"Latent Dirichlet Allocation", retrieved on Dec. 1, 2008 at <<http://en.wikipedia.org/wiki/Latent_Dirichlet_allocation>>, Wikipedia, Aug. 31, 2008, pp. 1-3.

Leibenluft, "A Librarian's Worst Nightmare: Yahoo! Answers, where 120 million users can be wrong", retrieved on Dec. 1, 2008 at <<http://www.slate.com/id/2179393/>>, Slate, 2008, pp. 1-3.

Li, et al., "Answer Extraction Based on System Similarity Model and Stratified Sampling Logistic Regression in Rare Date", retrieved on Dec. 1, 2008 at <<http://paper.ijcsns.org/07_book/200603/200603A27.pdf>>, IJCSNS International Journal of Computer Science and Network Security, vol. 6, No. 3, Mar. 2006, pp. 1-8.

Lin, et al., "Question Answering from the Web Using Knowledge Annotation and Knowledge Mining Techniques", retrieved on Dec. 1, 2008 at <<http://delivery.acm.org/10.1145/960000/956886/p116-lin.pdf?key1=956886&key2=5512028221&coll=GUIDE&dl=GUIDE&CFID=12983693&CFTOKEN=33492149>>, Proceedings of the twelfth international conference on Information and knowledge management, New Orleans, Louisiana, 2003, pp. 116-123.

Magnini, et al., "Is It the Right Answer? Exploiting Web Redundancy for Answer Validation", retrieved on Dec. 1, 2008 at <<http://acl.idc.upenn.edu/P/P02/P02-1054.pdf>>, Proceedings of the 40th Annual Meeting of the Association for Computational Linguistics (ACL), Philadelphia, Jul. 2002, pp. 425-432.

Molla, et al., "Question Answering in Restricted Domains: An Overview", retrieved on Dec. 1, 2008 at <<http://www.mitpressjournals.org/doi/abs/10.1162/coli.2007.33.1.41?cookieSet=1&journalCode=coli>>, MIT Press Journals, vol. 33, No. 1, Mar. 2007, 1 page.

Nyberg, et al., "Extending the Javelin QA System with Domain Semantics", retrieved on Dec. 1, 2008 at <<http://www.cs.cmu.edu/~mbilotti/pubs/Nyberg05.pdf>>, American Association for Artificial Intelligence (AAAI), 2005, 5 pages.

Popescul, et al., "Structural Logistic Regression for Link Analysis", retrieved on Dec. 1, 2008 at http://www.cis.upenn.edu/~popescul/Publications/popescul03mrdm.ps>>, Multi-Relational Data Mining Workshop, KDD-2003, 15 pages.

Silva, et al., "Analogical Reasoning with Relational Bayesian Sets", retrieved on Dec. 1, 2008 at <<http://www.gatsby.ucl.ac.uk/~heller/analogy-aistats2007.pdf>>, 8 pages.

Soricut, et al., "Automatic Question Ansering Using the Web: Beyond the Factoid", retrieved on Dec. 1, 2008 at <<http://www.isi.edu/~radu/Papers/JIR/QA-journal.pdf>>, Journal of Information Retrieval, Kluwer Academic Publishers, 2006, 15 pages.

Su, et al., Internet-Scale Collection of Human-Reviewed Data, retrieved on Dec. 1, 2008 at <<http://delivery.acm.org/10.1145/1250000/1242604/p231-su.pdf?key1=1242604&key2=7802028221&coll=GUIDE&dl=GUIDE&CFID=12983605&CFTOKEN=79317938>>, WWW 2007, May 8-12, 2007, Banff, Alberta, Canada, 2007, pp. 231-240.

"The Long Tail: Why the Future of Business is Selling Less of More", retrieved on Dec. 1, 2008 at <<http://en.wikipedia.org/wiki/The_Long_Tail>>, Wikipedia, Nov. 28, 2008, pp. 1-10.

Zhang, et al., "Expertise Networks in Online Communities: Structure and Algorithms", retrieved on Dec. 1, 2008 at <<http://www2007.org/papers/paper516.pdf>>, WWW 2007, May 8-12, 2007, Banff, Alberta, Canada, 2007, pp. 221-230.

* cited by examiner

| Features Used to Represent a Q-A Pair | |
|---|---|
| Textual Features of Question-Answer Pairs | |
| Question (answer) TF | Term frequency, stopwords removed, stemmed |
| Novel word TF | Term frequency of non-dictionary word, e.g., ms |
| # Common words | Number of common words in Q and A |
| Statistical Features of Question-Answer Pairs | |
| Quest. (ans.) raw length | Number of words, stopwords not removed |
| Q/A raw length ratio | Question raw length / answer raw length |
| Q/A term length ratio | Q/A length ratio, stopword removed |
| Q/A anti-stop ratio | #stopword_in_question/#stopword_in_answer |
| Common n-gram length | Length of common n-grams in Q and A |
| #Answers | Number of answers to a question |
| Answer position | The position of an answer in the q-a thread |
| User interaction / Social Elements Features | |
| #Interesting mark | Number of votes marking a question as interesting |
| Good mark by users | Number of votes marking an answer as good |
| Bad mark by users | Number of votes marking an answer as bad |
| Rating by asker | The asked assigned score to an answer |
| Thread life cycle | The time span between Q and its latest A |

Fig. 3

| Ranking Method | MRR |
| --- | --- |
| NN | 0.56 |
| Cosine | 0.59 |
| BSets | 0.67 |
| AR- based Ranking | 0.78 |

ANSWER RANKING IN COMMUNITY QUESTION-ANSWERING SITES

BACKGROUND

User generated content (UGC) is one of the fastest-growing areas of use of the Internet. Such content includes social question answering, social bookmarking, social networking, social video sharing, social photo sharing, and the like. UGC websites or portals providing these services not only connect users directly to their information needs, but also change everyday users from content consumers to content creators.

One type of UGC portal that has become very popular in recent years is the community question-answering site (CQA site). CQA sites currently available on the World Wide Web attract a large number of users both seeking and providing answers to a variety of questions on a variety of subjects. For example, as of December, 2007, one popular CQA site, Yahoo!®Answers, had attracted 120 million users worldwide, and had 400 million answers to questions available. A typical characteristic of such CQA sites is that the sites allow anyone to post or answer any questions on any subject. However, the openness of these sites predictably leads to a high variance in the quality of the answers. For example, since anyone can post any content they choose, content spam is produced by some users for fun or for profit. Thus, the ability, or inability, to obtain a high-quality answer has a significant impact on users' satisfaction with such sites.

Distinguishing high-quality answers from other answers on CQA sites is not a trivial task. For example, a lexical gap typically exists between a question and a high-quality answer that responds to the question. This lexical gap in community question answering may be caused by at least two factors: (1) a textual mismatch between questions and answers; and (2) user generated spam or flippant answers. In the first case, user-generated questions and answers are generally short, and the words that appear in a question are not necessarily repeated in high-quality answers that respond to the question. Moreover, a word itself can be ambiguous or have multiple meanings, e.g., "apple" can have a number of meanings, such as applying to "apple computer", "apple the fruit", etc. Also, different words can be used to represent the same concept, e.g., "car" and "automobile". Furthermore, in the second case, user generated spam and flippant answers can have a negative effect by greatly increasing the number of answers to each question, thereby generating "noise" and increasing the complexity in identifying a high-quality answer from among numerous other answers.

To bridge the lexical gap for better answer ranking, various techniques have been proposed. Conventional techniques for filtering answers primarily focus on generating complementary features provided by highly structured CQA sites, or finding textual clues using machine-learning techniques. For example, some conventional techniques enrich textual features with additional non-textual features, e.g., providing an answerers' category specialty, a questioners' self-evaluation, users' votes, and the like.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein address the task of identifying one or more correct, high-quality, or best answers that correspond to a particular question in a CQA site. Some implementations disclosed herein use previous relevant knowledge to bridge the lexical gap between questions and answers, and discover non-textual clues, or implicit relationships between questions and corresponding high-quality answers using an analogical reasoning-based ranking technique which models the latent relationships between questions and corresponding answers.

BRIEF DESCRIPTION OF THE DRAWINGS

The accompanying drawing figures, in conjunction with the general description given above, and the detailed description given below, serve to illustrate and explain the principles of the best mode presently contemplated. In the figures the left-most digit of a reference number identifies the figure in which the reference number first appears. In the drawings, like numerals describe substantially similar features and components throughout the several views.

FIG. 3 depicts exemplary textual and non-textual features that may be used to represent a q-a pair.

DETAILED DESCRIPTION

Figure 1:
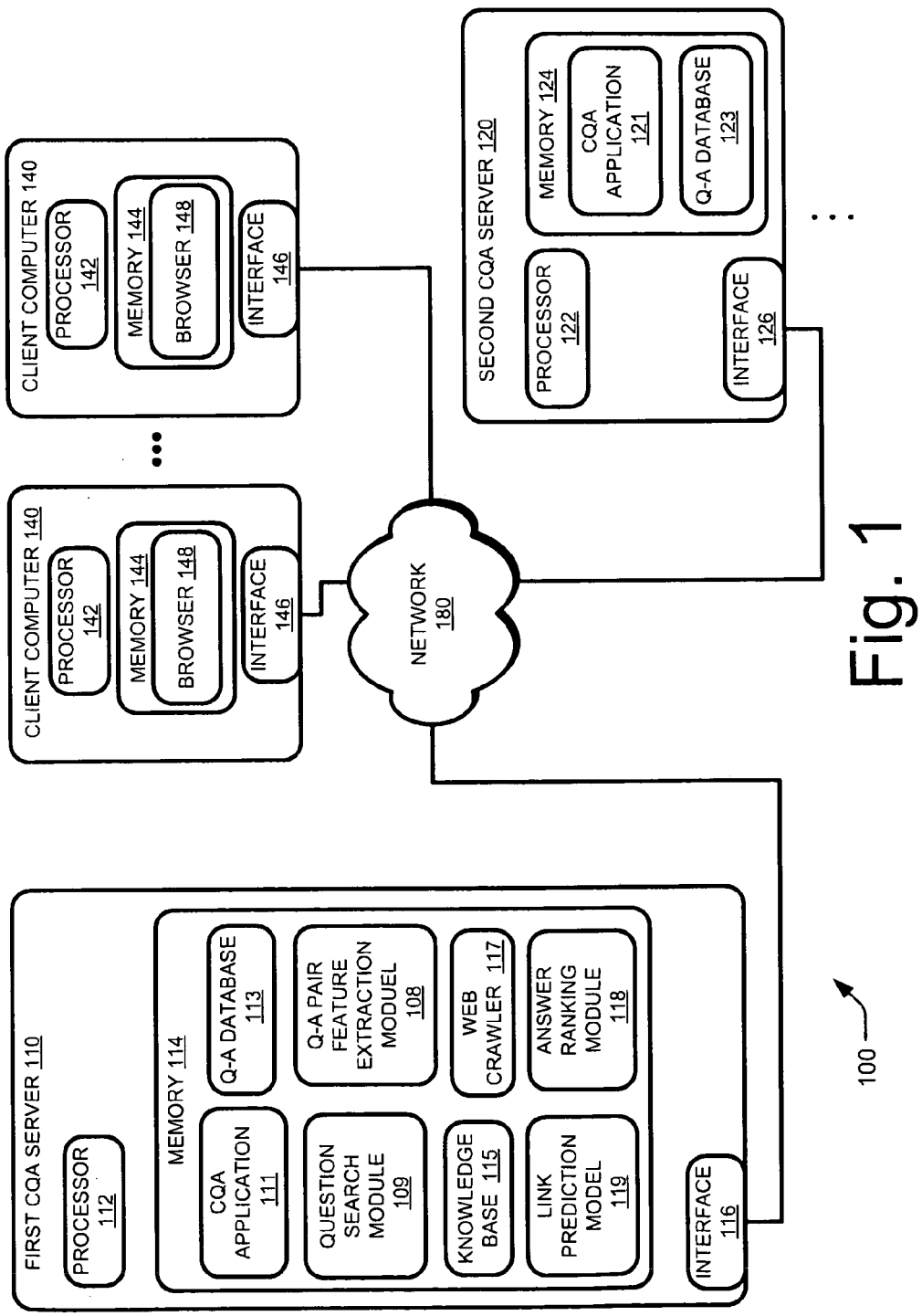
FIG. 1 depicts an illustrative logical and hardware arrangement of an exemplary system for implementations disclosed herein.

In the following detailed description, reference is made to the accompanying drawings which form a part of the disclosure, and in which are shown by way of illustration, and not of limitation, exemplary implementations. Further, it should be noted that while the description provides various exemplary implementations, as described below and as illustrated in the drawings, this disclosure is not limited to the implementations described and illustrated herein, but can extend to other implementations, as would be known or as would become known to those skilled in the art. Reference in the specification to "one implementation", "this implementation", "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or may be illustrated in block diagram form, so as to not unnecessarily obscure the disclosure.

Some implementations disclosed herein use gathered information of previous relevant questions and answers to bridge the lexical gap between new questions and answers, and then provide an analogical reasoning-based ranking technique and system for determining one or more suitable or most relevant answers for the new question.

Taking an ideal case as an example, when the knowledge base contains all the questions in the world, as well as their precise answers, then, to identify the best answer for a new question, what needs to be done is only to find the duplicate question in the knowledge base and use its precise answer to evaluate the quality of the answers to the new question. However, since it is impossible to obtain all the questions in the world, as users are submitting new questions every day, implementations herein search for a set of previously answered questions that match the new question according to some specified metrics (e.g., identifying relevant questions similar to the new questions in various ways) and learn from these previously answered questions how they are answered.

The similarity between a new question and previously answered questions can be measured using various methods discussed herein, such as representing each of the questions according to their word distributions and measuring the cosine similarity, or creating more complex machine learning models to define a new similarity metric, etc. On the one hand, the retrieved similar questions are more likely to have words in common with the candidate answers to the new question. On the other hand, it can be inferred from these questions and their precise answers how the questions similar to the new question are answered, and thus, implementations herein use this analogical-reasoning to identify high-quality answers for the new question from among a plurality of candidate answers. Thus, the "way of answering" can be regarded as a kind of linkage between a question and its best answer, and implementations herein set forth techniques for utilizing this to determine high-quality or "best" answers in a CQA environment.

In some implementations it is assumed that if a particular answer is right for a particular question, then one or more links must exist between the answer and the question; otherwise, if the answer is not a correct answer for the particular question, then the links do not exist. In some implementations, for example, for a given query question and its candidate answers, a set of related question-answer pairs (q-a pairs) are identified which are "linked" to each other in an analogous way, and this set may be used to rank the "linkage" of the q-a pairs composed of the query question and each of its candidate answers. For instance, the answer which has the strongest linkage to the query question may be assumed to be the best answer. Thus, rather than retrieving a set of questions and answers, and ranking a candidate answer of the query question by comparing the candidate answer to the answers of retrieved questions, implementations herein examine the links between existing questions (already answered questions) and their answers, and then compare those links with links between the new question and a number of candidate answers. The query q-a pair (i.e., new question-candidate answer pair) having the linkage most analogous to the linkage of the set of positive q-a pairs retrieved from the knowledge database may be presumed to contain the best answer to the new question. Implementations disclosed herein introduce one or more factors to explicitly model a latent linkage between questions and answers, and provide a model to predict the existence of such links between questions and answers in an information retrieval paradigm.

In some implementations, for example, each question-answer pair may be regarded as a relational data point, and a number of textual and non-textual features may be extracted to represent the particular q-a pair. A logistic regression model may be trained based on some collected positive and negative q-a pairs, i.e., q-a pairs with good answers or bad answers. The output of the model during a learning stage for a particular q-a pair is the probability of the existence of a linkage. In an online or querying stage, instead of using the model to directly predict a linkage, some implementations disclosed herein leverage a supporting set of q-a pairs to estimate the analogy of a q-a pair candidate. The supporting set of q-a pairs is retrieved based on the query question and contains only positive q-a pairs (i.e., q-a pairs in which a question is matched with a high-quality or best answer). This enables determination of the likelihood that the query q-a pair's linkage corresponds with linkages of the positive q-a pairs in the supporting set. A score may be determined indicating such analogy to each query q-a pair candidate, and the query q-a pair candidate having the highest ranked score is assumed to contain the best answer for the question. In some implementations, this answer is marked as the best answer for the particular question-answer thread in the CQA environment, and presented to users as such.

Thus, according to some implementations disclosed herein, rather than considering questions and answers separately or as individual objects, q-a pairs are treated as relational data, and latent linkages can be used to model their implicit relationship explicitly. Further, rather than using a learned model to directly predict the existence of a linkage between a question and an answer, some implementations disclosed herein retrieve a supporting set of linked question-answer pairs and combine this set with the learned model to predict the link existence. Thus, some implementations disclosed herein include a technique to evaluate how similar an identified link is to the links that connect questions to their correct answers in the supporting set.

An analogy may be defined as a measure of similarity between structures of related objects (e.g., q-a pairs). In some implementations herein, typically, it is not so important how each individual object in a candidate pair is similar to individual objects in the supporting set pairs. Instead, implementations rely on the similarity between the pairs of objects that may be used to predict the existence of the relationships. In other words, in these implementations, similarities between two questions or two answers are not as important as the similarity of one q-a pair with another q-a pair.

Probabilistic relational models are Bayesian networks which consider the concepts of objects, their properties, and relations between the objects simultaneously. Models of link existence in relational databases may be used to learn a logistic regression model for link strength prediction in q-a pairs. Implementations herein explicitly model these implicit relationships by assuming some latent linkages between questions and their correct answers, and attempt to predict such linkages with new q-a pairs through Analogical Reasoning (AR). In particular, some implementations herein assume that there exists a kind of link between each question and its right answer, and if an answer is incorrect, the link does not exist. Implementations herein train a model which predicts the existence of such links between questions and their candidate answers. In other words, in order to reduce the lexical gap between a question and a high-quality answer, instead of predicting the link directly based on the query question and its answers, implementations herein formulate the process as identifying which other q-a pairs with similar questions in a large-scale CQA dataset are linked in an analogous way and use this retrieved subpopulation to rank the links of candidate q-a pairs by measuring the similarity of linking features.

Implementations herein introduce some latent linkages to explicitly model the implicit relationships between questions and answers. Furthermore, implementations herein predict the probability of a linkage by evaluating how similar the linkage is to other linkages that connect questions to their high-quality or best answers. Thus, implementations explicitly model implicit objects in a linkage modeling technique that takes into consideration both the content and the structure of questions and answers, and uses the content features to infer the structure of questions and answers. Hence the explicit model of implementations herein takes into consideration both the positive data (i.e., q-a pairs with high-quality or right answers) and the negative data (i.e., q-a pairs with low-quality or bad answers).

Further, some implementations herein predict the strength of a linkage by investigating its analogy to other linkages in a manner similar to a Bayesian sets technique, as an example of one method for determining a rank of candidate q-a pairs; although, other ranking methods are also encompassed by the techniques herein.

FIG. 1 illustrates a logical and hardware arrangement of an exemplary system 100 depicting implementations disclosed herein. In FIG. 1, a first CQA server 110 is in communication with plurality of client computers 140 and one or more second CQA servers 120 via a network 180 or other suitable communication link. First CQA server 110 includes a processor 112, a memory 114 and an interface 116 for enabling communication over network 180. Further, each client computer 140 may includes a processor 142, a memory 144, and an interface 146 for enabling communication over network 180. Also, each second CQA server 120 may include a processor 122, a memory 124, and an interface 126 for enabling communication over network 180. Memories 114, 124, 144 may include volatile or nonvolatile random access memory, storage devices, such as disk drives, solid-state drives, removable storage media, other processor-accessible storage media, or the like. Servers 110, 120 and computers 140 may also include a number of additional components and software modules, as is known in the art, such as operating systems, communication modules, displays, user interfaces, peripherals, and the like, that are not illustrated for clarity of explanation. Network 180 may be the Internet, other wide area network, a local area network, or other communications link.

First CQA server 110 may include a CQA application 111 stored in memory 114 and executable by processor 112 for providing a CQA site. Further, memory 114 may include a Q-A database 113 of questions and answers implemented by the CQA application 111. CQA application 111 may include web applications that provide a CQA service that can be accessed by client computers 140 via browsers 148. Further, first CQA server 110 may include a web crawler 117, a question search module 109, a Q-A pair feature extraction module 108, an answer-ranking module 118, a link prediction model 119, and a knowledge base 115, as will also be described below. In some implementations, question search module 109, answer-ranking module 118 and/or link prediction model 119 are components of CQA application 111.

Second CQA server 120 also includes a CQA application 121 and a Q-A database 123 for presenting a second CQA site. In some implementations, users of computers 140 may use browsers 148 to access CQA sites provided by CQA application 111 on first CQA server 110, or CQA application 121 on second server 120, such as for searching for or posting a question or answer on the CQA sites.

Figure 2:
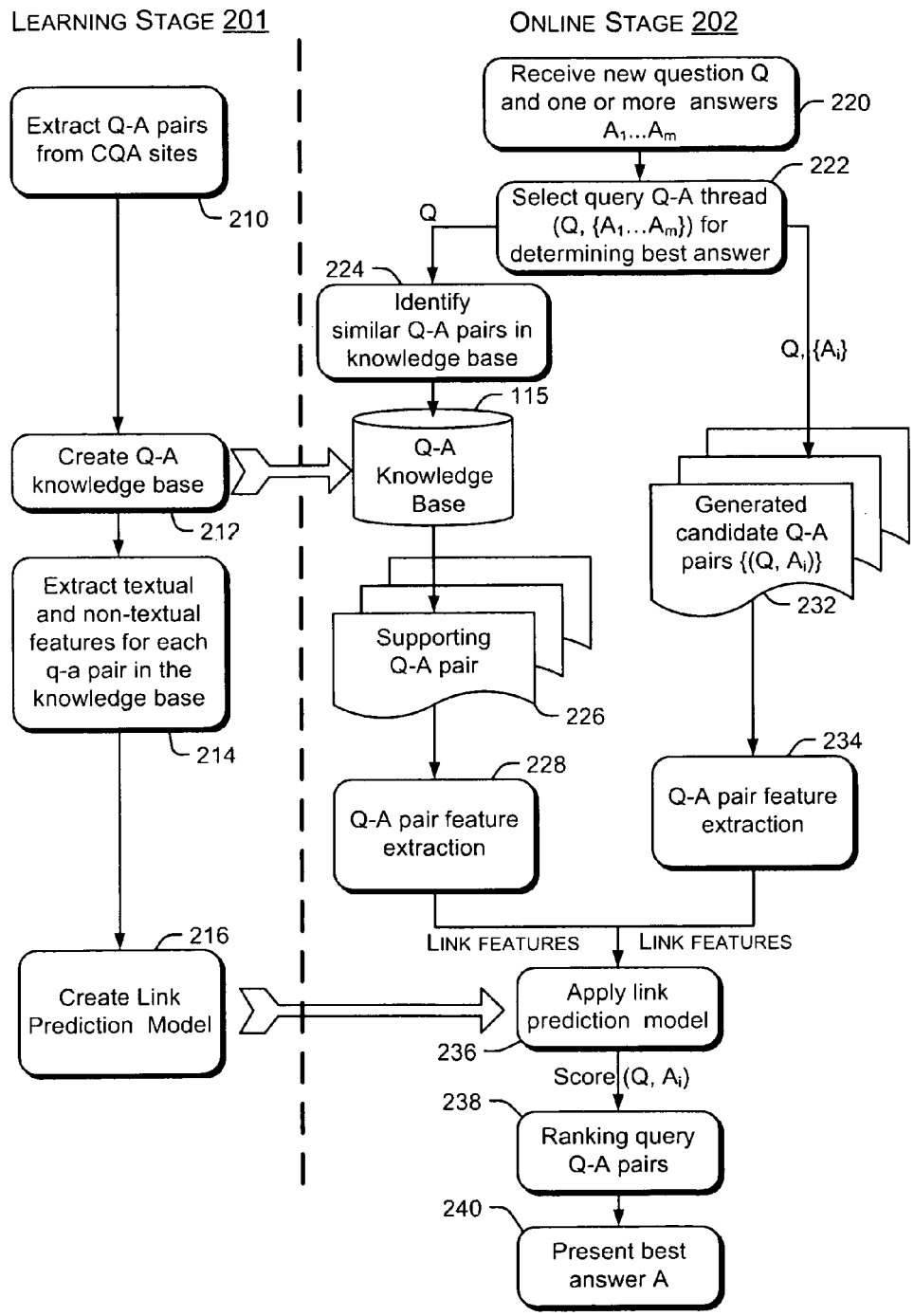
FIG. 2 depicts a flowchart of an exemplary process in conjunction with some implementations disclosed herein.

FIG. 2 illustrates an exemplary flowchart of a process 200 according to implementations herein. A goal of answer ranking in community question answering is to automatically identify from a closed list of candidate answers generated by everyday users the best answer that semantically answers the corresponding question. The process illustrated in FIG. 2 has a learning stage 201, during which training or learning of a link prediction model is carried out, and an online stage 202, during which the link prediction model is applied or used for determining a high-quality or best answer to a question-answer thread for which the best answer has not yet been determined. The learning stage 201 may use both positive and negative q-a pairs (i.e., q-a pairs with high-quality and low-quality answers, respectively) to learn the link prediction model, and then the link prediction model is created for use in the online stage.

In the online stage, when it is desired to locate a high-quality or best answer for a selected question-answer thread for which the best answer has not yet been determined, a supporting set of positive q-a pairs is first retrieved from the knowledge base using only the new question as a query. The supporting set, along with the learned link prediction model, is used for scoring and ranking each q-a pair, and the top-ranked q-a pair gives the best answer. In the online stage, firstly, implementations herein retrieve from the knowledge base a supporting set of positive q-a pairs located by searching for questions related to or similar to the selected query question. These q-a pairs are used to investigate whether the selected query thread belongs to their community. A list of q-a pairs is generated from the query q-a thread, with each pair containing only the selected question and one candidate answer. Both the supporting set of q-a pairs and each one of the candidate q-a pairs are submitted to the link prediction model which assigns a score to each candidate q-a pair. Then, the candidate q-a pairs are ranked in an order according to their scores. The top-ranked q-a pair is assumed to have the best answer for answering the selected query question.

In FIG. 2, at block 210, to enable learning during the learning stage 201, a large number of questions are extracted from one or more CQA sites. For example, first CQA server 110 may extract previously answered question and answer pairs from its own Q-A database 113. Alternatively, first CQA server 110 may access one or more second CQA servers 120 hosting CQA websites using a web crawler 117, or a similar program, for obtaining previously answered questions and their corresponding answers from the CQA sites, such as from Q-A database 123 on second CQA server 120. Both good and bad q-a pairs may be extracted from the CQA sites. The best answers are extracted and these are treated as positive q-a pairs. In these implementations, the q-a pairs extracted from the CQA sites for the Learning Stage 201 already have the best answer determined. For example, at some CQA sites, such as at Yahoo!®Answers, Live Search QnA, etc., the best answer for a question is tagged by the users of the CQA site. For instance, the best answer may be voted on by other users, may be picked as the best answer by the user that asked the question, or may be determined by other means. Furthermore, in addition to extracting the best answer for each question to create the positive q-a pair for each question, other answers may be extracted for each question as well, and these are treated as negative q-a pairs. For example, some answers might receive no votes or a negative rating at some CQA sites. In some implementations, an equal number of positive and negative q-a pairs are extracted, i.e., one positive answer and one negative answer for each question extracted.

At block 212, the extracted q-a pairs are used to construct a knowledge base containing a large number of q-a pairs. A large number of q-a pairs are stored in the knowledge base 115, some of which are directed to the same subject matter as other q-a pairs, i.e., when a huge number of questions and answers are collected on a variety of subjects there will be some overlap in the subject matter or content of a large number of the q-a pairs.

At block 214, a vector of textual and non-textual features (i.e., "linking features") is extracted for each q-a pair. Any feature definition can be used here, as long as the feature definition adequately describes a q-a pair. An example of such textual and non-textual features is illustrated in feature table 300 in FIG. 3.

A typical characteristic of CQA sites is its rich structure which offers abundant meta-data. Previous work has shown the advantage of combining such data with the textual features. Implementations herein define about 20 features to represent each q-a pair, as listed in feature table 300 of FIG. 3. In the example of FIG. 3, textual features 310 include question or answer term frequency 311, typically with stopwords removed; novel word term frequency 312, i.e., non-dictionary words, such as proper nouns; and number of common words 313, which is the number of words that the question and answer have in common. Non-textual features may include statistical features 320 and user interaction/social element features 330. Typical statistical features 320 of q-a pairs may include raw length 321 of the question or answer, i.e., without stopwords removed; Q/A raw length ratio 322, which is the ratio of the question raw length to the answer raw length; Q/A term length ratio 323, which is the ratio of the question to answer length with stopwords removed; Q/A anti-stop ratio 324, which is the ratio of the number of stopwords in the question to the number of stopwords in the answer; common n-gram length 325, which is the length of common n-grams in the question and answer; number of answers 326 that the question received; and answer position 327 in the q-a thread. User interaction/social elements features 330 may include the number "interesting marks" 331, which is the number of votes a question might receive in certain CQA sites that mark the question as interesting; good mark by users 332, which is the number of votes marking an answer as good; bad mark by users 333, which is the number of votes marking an answer as bad; rating by asker 334, which the score that the asker assigned to the answer; and thread lifecycle 335, which is the time span between when the question was posted and the latest answer. Further, it should be noted that the features listed in feature table 300 of FIG. 3 are only illustrative of the types of features that may be used for determining links between questions and answers, and that numerous other textual and non-textual features may be used in place of or in addition to the features listed in FIG. 3.

Returning to FIG. 2, at block 216, the link prediction model is created for each q-a pair based upon the values of the textual and non-textual features in the feature definitions being used to the construct the link prediction model. In some implementations, the link prediction model is a logistic regression model, whose output is the probability of a kind of relationship (referred to herein as a "link" or "linkage") between a question and an answer. If the link exists, then the answer is assumed to be the right one for the question; otherwise if a link does not exist or has a possibility score below a predetermined threshold, then the answer is deemed to be an incorrect or a low-quality answer for the question. Note that any model can be used instead of logistic regression here as long as it provides a kind of prediction on whether a link exists. The learned link prediction model may then be applied in online stage 202, when it is desired to locate a best answer for a question-answer thread that does not yet have a best answer determined.

In the online stage 202, the first CQA server 110 receives questions and corresponding answers from users of client computers 140. For example, a first user of a first client computer 140 might post a new question Q. Other users of other client computers 140 post answers $A_1, \ldots A_m$ to the new question Q on the CQA site. This results in a plurality of new question-answer query threads (q-a threads) being created by users of client computers 140 at the CQA site hosted by first CQA server 110.

Figure 4:
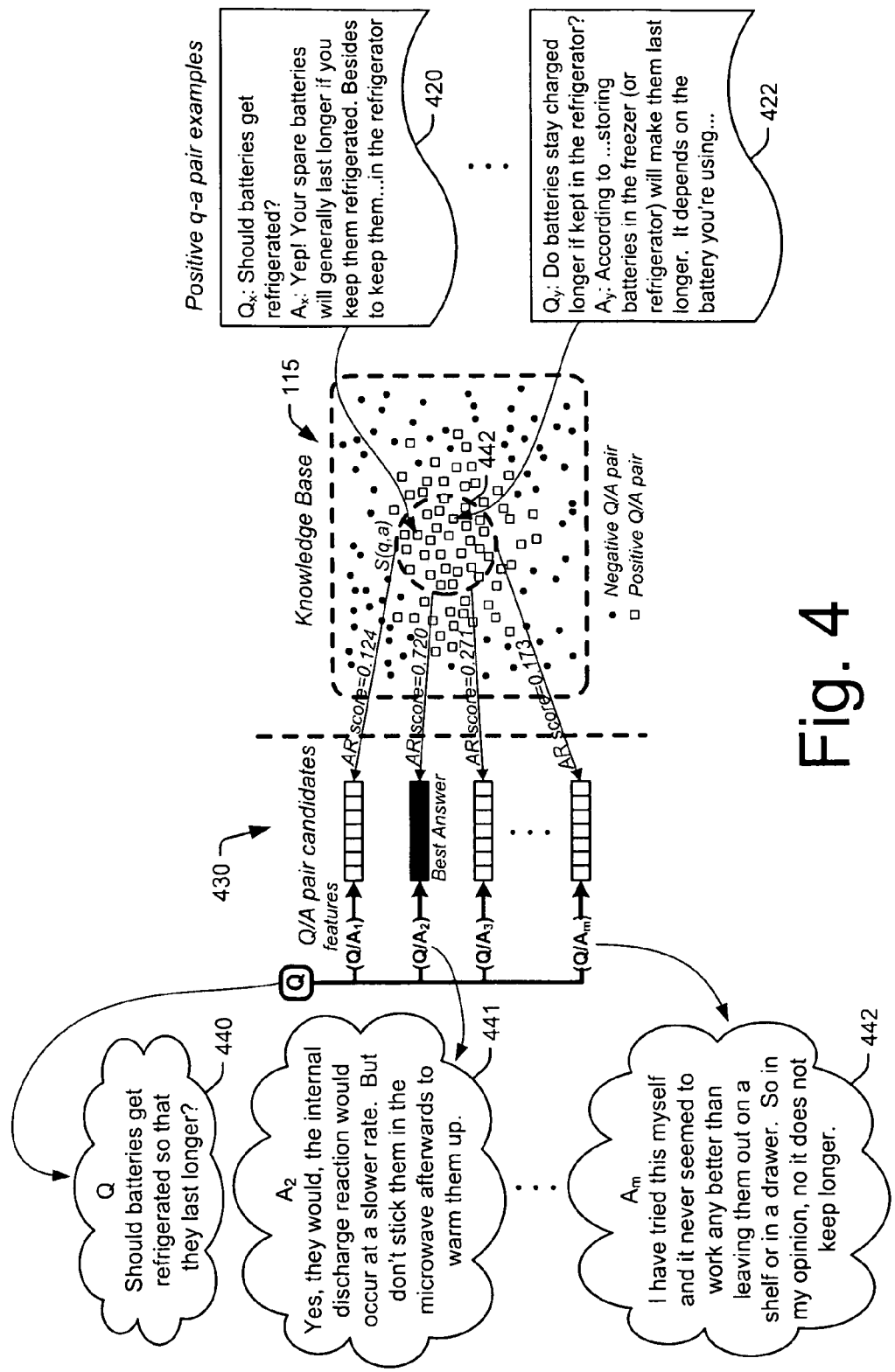
FIG. 4 depicts an example of locating a high-quality answer for a question according to some implementations.

At block 224, one of the new question-answer query threads is selected to be processed to determine which answer from among the one or more answers $A_1, \ldots A_m$ is a correct or highest quality answer for the question Q that initiated the q-a thread. For example, the CQA site may set a time limit, after which the q-a thread is considered closed and the best answer is determined. Other methods of selecting a particular q-a thread might be that a threshold number of answers have been received, or the like. FIG. 4 illustrates an example of a question-answer thread corresponding to the process of FIG. 2. In FIG. 4, a new question Q 440 is posted at a CQA site and a plurality of answers $A_1, \ldots, A_m$ are posted, resulting in a q-a thread 430. Q-a thread 430 is selected for locating a correct answer from among the answers $A_1, \ldots, A_m$ by using the knowledge base 115 and the link prediction model 119 previously learned. In this example, the question 440 relates to whether batteries should be refrigerated so that they last longer. Of course, this is just an example, and the question may be on any subject.

At block 224, a search is carried out by the question search module 109 using the query question Q to locate other questions in the knowledge base 115 that are related to similar content or subject matter. For example, in some implementations, a text search may be conducted using keywords, or the like, such as searching for questions in the knowledge base 115 that contain keywords also contacted in the query question Q from the q-a thread 430. Alternatively, or in addition, in some implementations, classifiers may be learned based on the questions contained in the knowledge base 115, so that questions in the knowledge base are classified into various classes, subclasses, etc., and query question Q may be classified into one of the classes or subclasses, and the q-a pairs from the identified class or subclass may be retrieved as the supporting set S(q,a).

At block 226, if the knowledge base 115 is large enough, a large number of questions might be directed to similar content. A supporting set of positive q-a pairs is identified from the knowledge base 115 using the new question Q as a clue or input. Various approaches can be used to identify the supporting set, e.g., using Q as a query to retrieve the relevant positive q-a pairs; or training a classifier and assuming the q-a pairs whose questions are in the same class with Q are the supporting set. As illustrated in FIG. 4, each q-a pair in the knowledge base is represented by a vector of textual and non-textual features as listed in FIG. 3. The small squares in the knowledge base 410 stand for "positive" q-a pairs whose answers were determined to be good, while the black dots represent negative q-a pairs whose answers were not determined to be good (although not necessarily noisy). Based on the selected query question Q, implementations herein identify some relevant q-a pairs by measuring the similarity of the questions, such as by key word which may comprise using the textual features 311-313 of FIG. 3. The identified supporting set S(q,a) of q-a pairs having similar questions is marked as dashed circle 412 in FIG. 4. Further, it should be noted that while block 224 is for similar questions, implementations herein do not require that the questions located be on the identical subject matter or content.

At block 228, q-a pair feature extraction is carried out by the Q-A pair feature extraction module 108 on the q-a pairs that were located by block 224 to identify linking features present between the questions and answers in the supporting set of positive q-a pairs. This is carried out using specified textual and non-textual features, such as some or all of the features listed in table 300 of FIG. 3. Both the features of supporting q-a pairs and those of the candidate q-a pair are input into the link prediction model, which measures the similarity of the candidate q-a pair's features to the supporting features. In some implementations, the similarity can be measured by evaluating how much information gain is obtained by predicting the linkage of the candidate q-a pair in the existence of the supporting q-a pairs, compared with the case in which only candidate q-a pair features are available. The information gain may be defined as the subtraction of two log-likelihoods A and B, where A measures the probability that a linkage exists when both the candidate q-a pairs and the supporting q-a pairs are observed; and B measures this probability when only the candidate q-a pair is observed.

Meanwhile, at block 232, the selected query q-a thread is examined to generate candidate q-a pairs from the question Q 440 and the answers $A_1, \ldots A_m$ that were provided in the q-a thread.

At block 234, each candidate q-a pair also undergoes feature extraction by the Q-A pair feature extraction module 108 using the same features used at block 228. Both textual and non-textual linking features may be extracted, as discussed above. For example, textual features may include the term frequency of a dictionary word, the term frequency of a novel word, etc., while non-textual features may include some statistical ones such as the number of words in a question and in an answer, the raw length ratio of a question and one of its answer, or numerous other features, as discussed above and as illustrated in FIG. 3.

At block 236, the link prediction model is applied by the answer ranking module 118 to the linking features identified in the q-a pairs of the supporting set S(q,a) obtained from the search results and the linking features identified in each candidate q-a pair from the selected query thread 430. The task of the link prediction model is to estimate the likelihood that a particular candidate q-a pair contains a good answer. Given question Q 440 and answers $A_1, \ldots A_m$, implementations herein measure the analogy of each candidate q-a pair to the supporting set of q-a pairs obtained from the knowledge database 115 by comparing the extracted linking features of each and assigning a score to each candidate q-a pair from the selected query thread 430. In some implementations, Analogical Reasoning (AR) is used based on a Bayesian link prediction model for determining a score. For example, as illustrated in FIG. 4, candidate q-a pair $Q/A_1$ is determined to have an AR score of 0.124, q-a pair $Q/A_2$ is determined to have an AR score of 0.720, q-a pair $Q/A_3$ is determined to have an AR score of 0.271, and q-a pair $Q/A_m$ is determined to have an AR score of 0.173. The method for determining the AR score is described in additional detail below. In some implementations, other techniques are used for determining the score. For example, since each q-a pair can be represented as a feature vector, it is possible to compute the similarity of each query q-a pair to each of the supporting set q-a pairs and then sum up the similarities as the score. In some implementations, a threshold can be established for each feature used out of the features listed in FIG. 3 based on the features extracted on the q-a pairs of the supporting set S(q,a). When examining each query q-a candidate pair, if the feature is above the threshold, the similarity is assumed to be "1" and below the threshold "0". Then, the values of the 1s and 0s are summed up as the score for each candidate q-a pair from the q-a thread. The candidate q-a pair having the highest score is presumed to contain the best answer. Other methods for establishing scoring of the candidate q-a pairs will also be apparent to those of skill in the art in view of the disclosure herein. Further, while the features listed in FIG. 3 are used in this example, it should be noted that the feature list of FIG. 3 is not exhaustive of the features that may be used in some implementations herein.

At block 238, the candidate answers are sorted by the answer-ranking module 118 in an ascending or descending order of the score determined for each candidate q-a pair so as to rank the candidate answers.

At block 240, the highest-ranked candidate answer (i.e., the candidate answer from the candidate q-a pair having the highest score is assumed to be the best answer A of the query question Q. In some implementations, this highest-ranked answer is marked as the best answer in the CQA website and the highest-ranked answer is presented to the users of the CQA site with an indication or mark to designate that answer A as the best answer for the particular question Q. In the example of FIG. 4, answer $A_2$ 441 was determined to have an AR score of 0.720, which was the highest score from among the candidate answers, while answer $A_m$ 442 might be the lowest-scored answer. Thus, answer $A_2$ is determined to be the best answer for the query thread 430, and this answer is presented to users of computers 140 as the best answer when they view the particular q-a thread at the CQA site.

Finding Similar Q-A Pairs

In implementations of set-based reasoning, as aforementioned, at blocks 224-226a supporting set S(q,a) of similar questions are identified and retrieved from the knowledge base, so that implementations herein can determine the likelihood of the existence of a linkage between a selected question and candidate answers, such as for a newly-created q-a query thread or an existing q-a query thread for which a best answer has not yet been determined. The supporting set is used to rank the new query candidate q-a pairs by evaluating how analogous a query q-a pair link is to the links in the supporting set q-a pairs. This set-based reasoning ranks candidate q-a pairs using community intelligence in which a set of existing q-a pairs is used to help identify other candidate q-a pairs that would also fit in with the set of existing q-a pairs. By comparing a candidate q-a pair with a number existing q-a pairs in a set, greater accuracy may be obtained than by using a single q-a pair for comparison. Thus, implementations herein use set-based reasoning formulation for matching high-quality answers with questions.

In a specific implementation herein, 29.8 million questions and their associated answers were examined on a CQA site using a web crawler to create the knowledge base 115. From this knowledge base relevant questions were retrieved through traditional information retrieval techniques. In particular, let $Q_q$ be a query question and its answer list be $\{A_q^i, 1 \leq i \leq M\}$, then retrieve those q-a pairs $S=\{Q^1:A^1, Q^2:A^2, \ldots, Q^L:A^L\}$ with high cosine similarity above a threshold:

$$S=\{Q^i:A^i \mid \cos(Q_q, Q^i) > \delta, i \in \{1, \ldots, D\}\} \qquad (1)$$

where D is the size of the knowledge base and δ is a threshold. Each question is represented in the bag-of-word model. How δ affects the ranking performance is demonstrated below.

Accordingly, whether the retrieved questions are actually similar to the query question is not in fact necessary in this approach. This is because the ranking model models the similarity between structures of q-a pairs, rather than the similarity between individual objects (i.e., individual questions or individual answers). Moreover, when the supporting dataset is large enough, simple document ranking and n-gram extraction techniques work very well.

Further, it should be noted that the $A^i$ in S stands for the correct or high-quality answer of question $Q^i$. Implementations herein apply set-based reasoning to investigate how analogous a candidate q-a pair is to a set of known positive q-a pairs. Hence, in implementations herein, it is desired to retrieve only positive or "linked" q-a pairs from the knowledge base at blocks 224-226, and based on these retrieved known linked q-a pairs, the linkage strength of a candidate q-a pair can be estimated.

Analogical Reasoning with Retrieved Q-A Pairs

Some implementations may adopt a Bayesian Analogical Reasoning (BAR) framework as one method of learning the latent linkages between questions and answers. Additional information on BAR is discussed in Silva, R., Heller, K. A. and Ghahramani, Z., *Analogical reasoning with relational Bayesian sets*, 11th International Conference on Artificial Intelligence and Statistics (AISTATS), March 2007, San Juan, PR, US. In the implementations using the BAR framework, a Relational Bayesian sets technique may be used to predict how analogous a link of a query candidate q-a pair is to the links in the supporting set q-a pairs. For example, the links between questions and answers in the supporting set may be used to train a logistic regression model with a Gaussian prior probability distribution derived from the links of the q-a pairs in the supporting set. For achieving a more discriminative formulation, this model can be based on both positive q-a pairs and negative q-a pairs. The candidate q-a pairs from the selected query q-a thread can then be ranked by the probability as to whether each candidate q-a pair should be part of the supporting set of q-a pairs based upon the relative linking features of each. In some implementations, this process may be carried out by answer ranking module 118 or other suitable module stored in memory 114 of FIG. 1.

Figure 5:
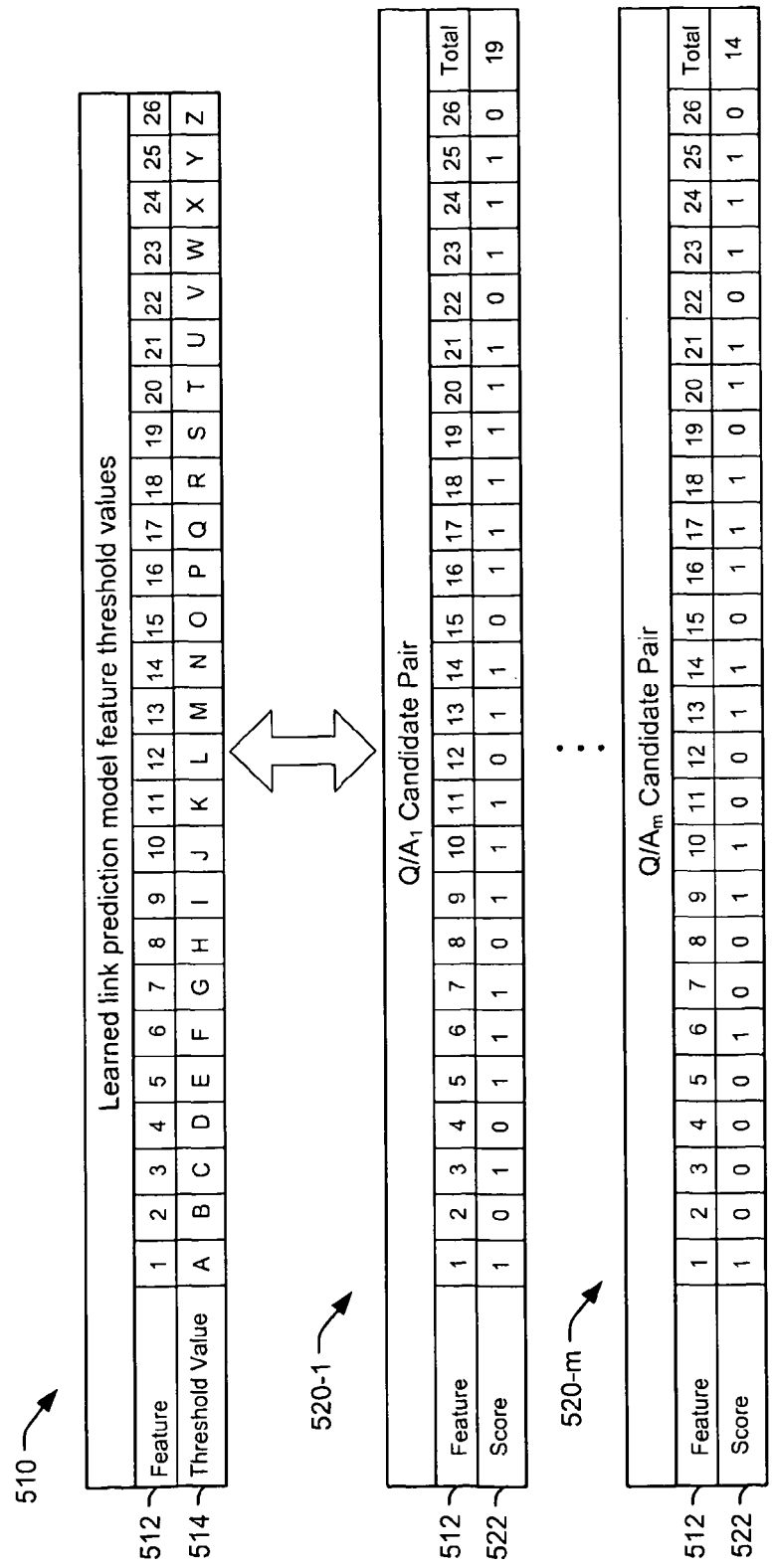
FIG. 5 depicts an example of ranking candidate q-a pairs according to some implementations.

Further, while BAR is used as one example herein of a method for determined linkages between q-a pairs, it should be noted that many other methods may be used as well in the implementations herein. For example, in other implementations, since each q-a pair in the supporting set is represented in some features, such as the ones listed in FIG. 3, but not limited to them, then in some implementations, PCA (Principle Component Analysis) transformation may be applied onto the supporting set which produces a transfer space as well as a threshold (e.g., 0). A query q-a pair may then be mapped onto this PCA space for a new transformed feature representation. FIG. 5 illustrates some of these implementations, and includes learned link prediction model representation 510 that includes twenty-six features 512 and corresponding threshold values 514 that have been learned from the supporting set of q-a pairs. As discussed above, the linking features of the supporting set of q-a pairs are extracted and subjected to PCA, logistic regression, or other analysis to determine threshold values for each feature in the supporting set of q-a pairs. Then, for each of the twenty-six linking features contained in the link prediction model representation 510, each candidate q-a pair 520-1 through 520-*m* from the selected query q-a thread is examined to determine a score 522 for each linking feature 512. In the illustrated example of FIG. 5, if a value of a feature of a q-a candidate pair 520 is above the corresponding threshold value 514 for that feature 512, then the similarity on the corresponding dimension is assumed to be "1"; while if the value of the feature of the q-a candidate pair 520 is below the corresponding threshold value, the similarity on that dimension is "0". The 1s and 0s are then summed up as the total score for each candidate q-a pair, and the q-a pair having the highest score is determined to be the best answer. In some implementations, this process may be carried out by answer ranking module 118 or other suitable module stored in memory 114 of FIG. 1.

Figure 6:
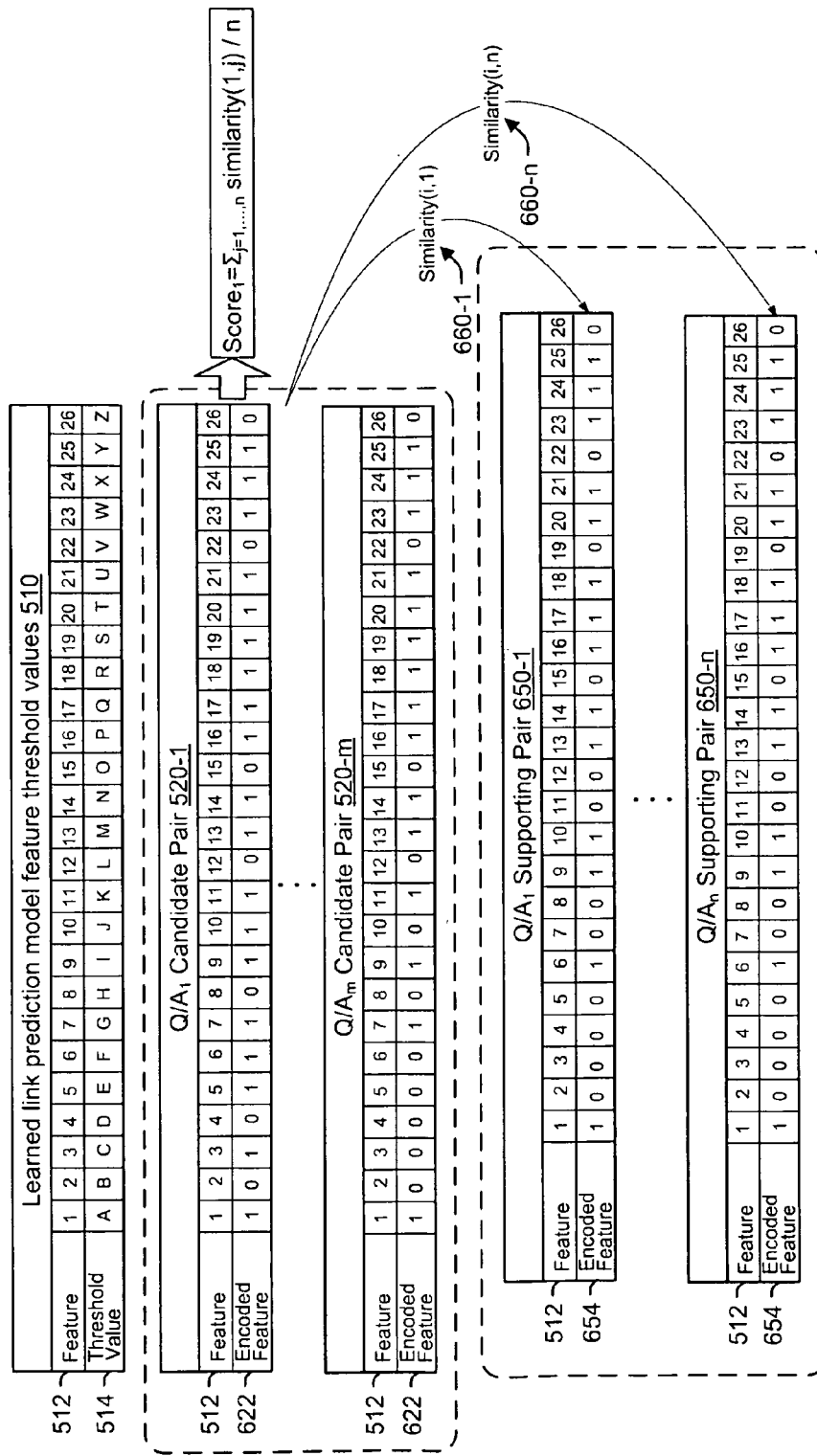
FIG. 6 depicts an alternative example of ranking candidate q-a pairs according to some implementations.

In other implementations, as shown in FIG. 6, each of the candidate q-a pairs and supporting q-a pairs can be mapped to a sequence of 0s and 1s using the similar idea as above. This results in the q-a candidate pairs 520-1 through 520-*m* having encoded features 622. Then, instead of merely adding the 1s and 0s, to determine score, the similarity of each query candidate q-a pair 520 is computed for each of the supporting set q-a pairs 650-1 through 650-*n* having encoded features 654. The similarities 660-1 through 660-*n* are summed up or averaged as the score for each candidate q-a pair such as by the equation $$\text{Score}_i = \Sigma_{j=1,\ldots,n} \text{similarity}(i,j)/n \qquad (2)$$

where i=1, . . . , m. Then, the candidate q-a pair 520 that has the highest score is determined to contain the best answer for the selected query question Q. In some implementations, this process may be carried out by answer ranking module 118 or other suitable module stored in memory 114 of FIG. 1.

Figure 7:
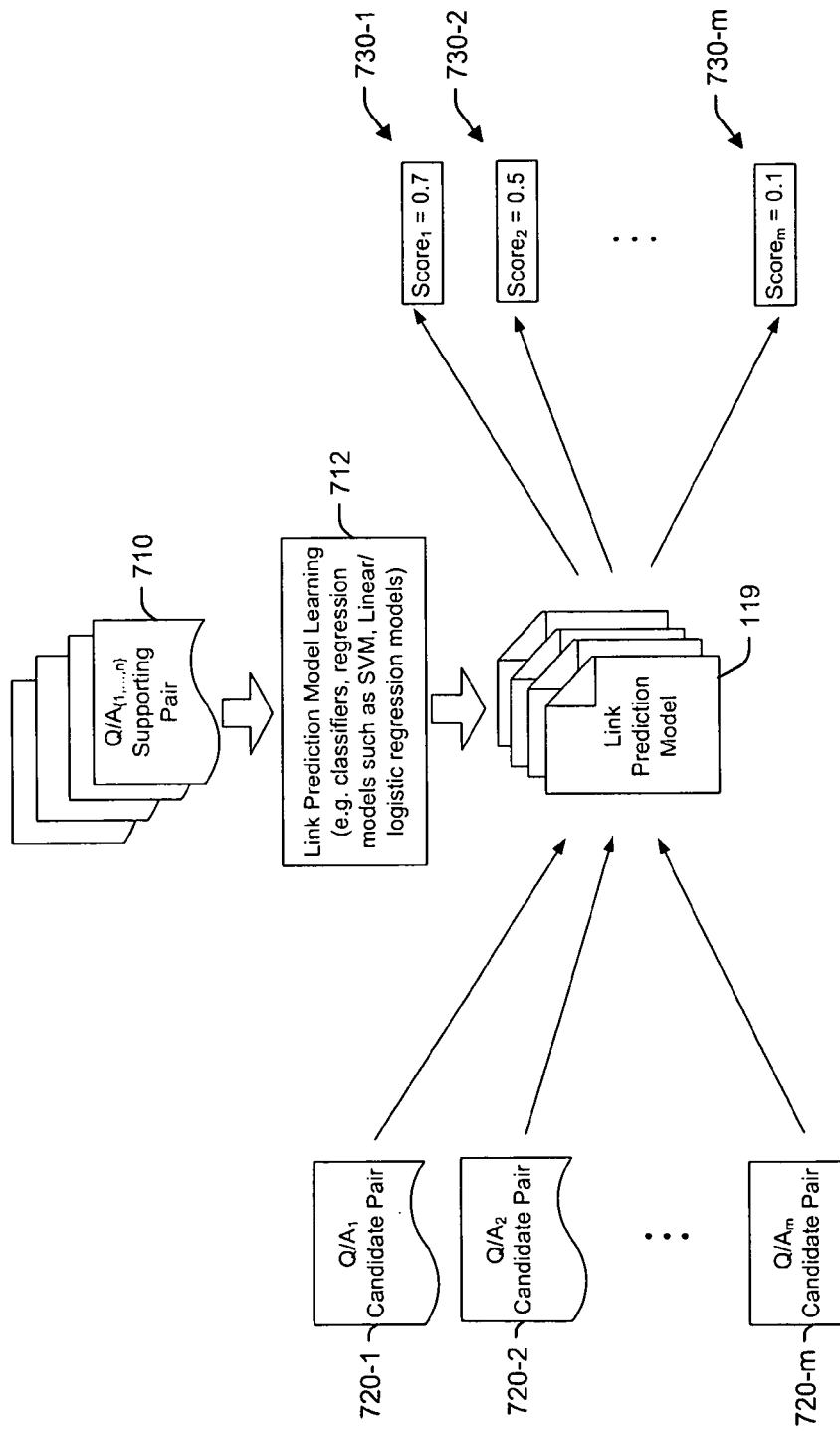
FIG. 7 depicts another alternative example of ranking candidate q-a pairs according to some implementations.

In yet other implementations, as shown in FIG. 7, a classifier or a regression model such as linear regression, SVM (support vector machine) regression, etc., may be constructed based on the supporting set and the model can be used to predict the candidate linkage. In FIG. 7, the q-a pairs in the supporting set 710 are processed using link prediction model learning 712, which may include classifier modules, regression model modules, such as SVM, linear/logistic regression model modules with various types of prior probability distributions derived from the supporting set, or the like. In some implementations, the link prediction model learning 712 may be carried out by answer ranking module 118 or other suitable module stored in memory 114 of FIG. 1. The link prediction model learning results in link prediction model 119. As described above with respect to FIG. 2, the link prediction model 119 is used to determine a probability that a particular q-a candidate pair 720-1 through 720-*m* should be a member of the supporting set of q-a candidate pairs based upon the linking features extracted from each candidate q-a pair. The link prediction model 119 determines the probability, and the probability serves as the score 730 for each candidate q-a pair 720. The candidate q-a pair 720 with the highest probability of belonging to the supporting set 710 is determined to contain the best answer to the selected query question Q.

Consequently, some implementations herein are directed to retrieving a similar questions and using the q-a pairs having good answers to suggest the linkage of a query candidate q-a pair. Finding similar questions helps to identify those important subpopulations. Thus, the links of relevant questions are more likely to have semantically analogous links to the query link (i.e., the reinforcement between content and linkage). Furthermore, implementations herein measure the analogy of a candidate linkage to the supporting set linkages indicating good or high-quality answers. Since good answers answer a question semantically rather than lexically, such a formulation is more likely to identify links that semantically attach an answer to its question.

Evaluation

In order to evaluate the implementations herein, 29.8 million questions were crawled from a CQA site using a web crawler. Each question had about 15 answers on average. These questions cover 1550 categories defined by this site, and all of them have user-labeled "best answers", which is a good test bed to evaluate implementations herein. Approximately 100,000 q-a pairs were used to train the link prediction model, with comparative numbers of positive q-a pairs (i.e., many linking features) and negative q-a pairs (i.e., few linking features), and then the entire process was tested with about 210,000 q-a pairs. Implementations herein were compared with two widely adopted information retrieval metrics and one state-of-the-art method, and achieved significant performance improvement on average precision and mean reciprocal rank. The results indicate that the implementations herein that take into account the structure of relational data are useful in the noisy environment of a CQA site, and more effective than traditional approaches based on individual intelligence.

The widely adopted Average Precision@K and Mean Reciprocal Rank (MRR) metrics were used to evaluate the Analogical Reasoning-based ranking techniques described herein.

Average Precision@K: Precision@K, or P(K), for a given query is defined as the fraction of relevant answers ranked in the top K results; and Average Precision@K is the mean of P(K) value on the online query set. The higher the precision, the better the performance. In the present case, only the "best answer" tagged by an asker in CQA database is regarded as relevant.

Mean Reciprocal Rank (MRR): The MRR of an individual query is the reciprocal of the rank at which the first relevant answer was returned, or 0 if none of the top K results contained a relevant answer. The score for a sequence of queries is the mean of the individual query's reciprocal ranks:

$$MRR = \frac{1}{|Q_r|} \sum_{q \in Q_r} \frac{1}{r_q} \quad (3)$$

where $Q_r$ is a set of test queries, $r_q$ is the rank of the first relevant answer for question q.

The Nearest Neighbor Measure (NN): for a given set of objects and a query object, their distance is given by the minimum distance between the query and any individual object in the set.

The Cosine Distance Metric (COS): the cosine distance between two vectors is the inner product of their normalized vectors, where the normalized vector is obtained by dividing it by its Euclidean norm. The cosine distance between a point and a set is defined as the average cosine distances.

The Bayesian Set Metric (BSets): This metric gives state-of-the art performance for ranking tasks such as retrieval of word concepts and images.

None of the baseline methods take into account how the content features of relational objects contribute to their interactions, and hence are sensible for evaluation of the effectiveness of the analogical reasoning techniques implemented herein.

Figures 8A, 8B:
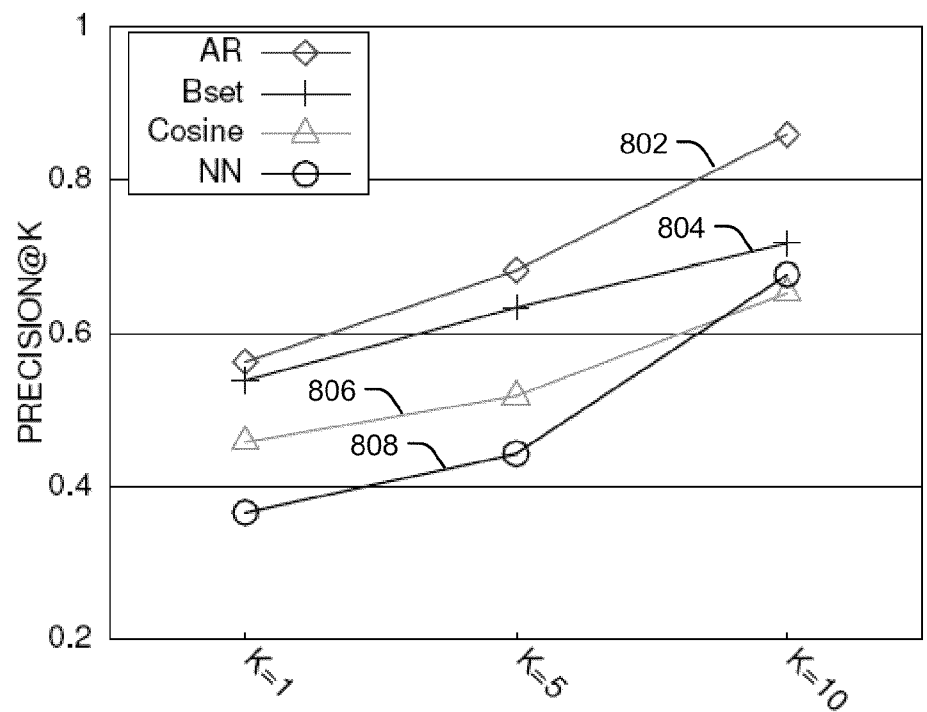
FIGS. 8A-8B depict exemplary evaluation results of some implementations disclosed herein.

FIG. 8A illustrates a graph 800 showing the performance of some implementations herein and the baselines with the Average Precision@K metric with K=1, 5, 10. Note that since each question has less than 15 answers on average, the average precision at K>10 is not evaluated. The diamond curve 802 shows the performance of the Analogical Reasoning-based ranking method set forth herein. The cross curve 804 represents the BSets method, and triangle curve 806 represents the COS method, and circle curve 808 represents the performance of the NN method. In all cases, the implementation herein significantly out-performed the baselines. The gap between the Analogical Reasoning-based ranking method and the baselines suggests that reasoning with data structures is more robust than reasoning with the content, which is because in CQA sites, questions are very diverse and the supporting documents retrieved from a CQA database are not necessarily semantically similar to the query question. The experimental result that the NN method performed the worst, demonstrates that the lexical gap between questions and answers, questions and questions, and q-a pairs cannot be ignored.

Moreover, both the Analogical Reasoning-based method herein and Bayesian Sets worked better than COS and NN metrics. This shows that set-based reasoning, as disclosed herein, is more effective and robust in a noisy environment than simply estimating the similarity between two individual objects.

Table 810, as illustrated in FIG. 8B depicts the MRR performance of the AR method herein and the baselines. The trend coincides with the one that is suggested by the Average Precision@K measure, i.e., the AR method performed the best, and BSets performed second best, while NN produced the worst performance. Again, implementations herein significantly out-performed the baseline methods.

From the foregoing, it should be apparent that implementations herein provide an Analogical Reasoning-based ranking method for ranking answers to questions, such as in a CQA site. Implementations herein assume that if an answer is right for a question, then there exists a link between the answer and question; otherwise, when an answer is not right for a question, there is no link. Implementations herein introduce a factor to explicitly model the latent linkages between questions and answers and set forth a model to predict the existence of such links in an information retrieval paradigm. In particular, each q-a pair is regarded as a relational data point and a number of textual and non-textual features are extracted to represent each q-a pair. Then, a link prediction model is learned based on some number of positive and negative q-a pairs, or q-a pairs with good answers or bad ones. In some implementations, the output of the model for online use is the probability of the existence of a linkage. In the online querying stage, instead of using the model to directly predict a linkage, implementations herein leverage a supporting set of existing q-a pairs to estimate the analogy of a candidate q-a pair. The supporting set of existing q-a pairs is retrieved with the query question as an input and contains only positive q-a pairs. Implementations measure how likely the candidate q-a pair's linkage "fits to" the linkages in the supporting set of q-a pairs. A score can be assigned indicating such analogy to each candidate q-a pair, and the top-scored candidate q-a pair is assumed to contain the best answer for the question. The approach herein significantly out-performed the baselines in all cases, which shows that in the noisy environment of a CQA site, taking the structure of relational data into account is beneficial.

Implementations also relate to a system and apparatus for performing the operations described herein. This system and apparatus may be a particular machine specially constructed for the required purposes, and may include one or more computers selectively activated or reconfigured by one or more programs when the program instructions are executed. Such programs may be stored in one or more processor-readable storage mediums having processor-readable program code embodied therein. The processor-readable program code is implemented at least in part by one or more processors to perform functions of the implementations described herein. The one or more processor-readable storage mediums may include, but are not limited to, optical disks, magnetic disks, read-only memories, random access memories, solid-state devices and drives, or any other type of medium suitable for storing electronic information, and may be stored at a location remote from the one or more processors executing the one or more programs.

Some implementations are described in the context of computer-executable instructions, such as program modules, and executed by one or more computers or other processing devices. Generally, program modules include routines, programs, objects, components, data structures, and the like, that perform particular tasks or implement particular functions. Typically, the functionality of the program modules may be combined or distributed as desired in various implementations. In addition, implementations are not necessarily described with reference to any particular programming language. It will be appreciated that a variety of programming languages may be used to implement the teachings described herein. Further, it should be noted that the system configurations illustrated in FIG. 1 are purely exemplary of systems in which the implementations may be provided, and the implementations are not limited to the particular hardware configuration illustrated. In the description, numerous details are set forth for purposes of explanation in order to provide a thorough understanding of the disclosure. However, it will be apparent to one skilled in the art that not all of these specific details are required.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims. Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Rather, the scope of this patent is to be determined entirely by the following claims, along with the full range of equivalents to which such claims are entitled.

The invention claimed is:

1. A method carried out by a first community question-answer (CQA) server comprising:
   collecting a plurality of first questions and corresponding first answers as a plurality of first question-answer (q-a) pairs;
   selecting a second question and a plurality of candidate second answers as a plurality of candidate second question-answer (q-a) pairs for making a determination of answer quality;
   identifying a set of the first questions that are similar to the second question;
   determining first linking features between the identified set of first questions and the corresponding first answers;
   comparing the first linking features with second linking features determined between the second question and each of the candidate second answers for predicting analogous linking features; and
   ranking the candidate second answers based on the comparing.

2. The method according to claim 1, further comprising:
   creating a link prediction model from the plurality of first q-a pairs; and
   using the link prediction model in combination with the first linking features to predict a likelihood of the second linking features being analogous to the first linking features.

3. The method according to claim 2, further comprising:
   ranking the candidate second answers according to the predicted likelihood that a second q-a pair formed from the second question and a particular candidate second answer has second linking features analogous to the first linking features; and
   selecting a best answer based on the ranking of the candidate second answers.

4. The method according to claim 3, further comprising:
   applying a set-based reasoning method using the learned link prediction model to determine a score for each candidate second answer, the score representing the predicted likelihood that a second q-a pair formed from the second question and the particular candidate second answer has second linking features analogous to the first linking features.

5. The method according to claim 1, further comprising:
   connecting said first CQA server with a second CQA server over a network, said second CQA server containing a question-answer database, wherein the collecting the first q-a pairs further comprises extracting at least some of the first q-a pairs from the second CQA server over the network.

6. The method according to claim 5, further comprising:
   collecting the first q-a pairs from both the second CQA server and from the first CQA server to form a knowledge base at the first CQA server.

7. The method according to claim 1, wherein the collecting the first q-a pairs further comprises collecting both positive first q-a pairs containing a first answer previously identified as a high-quality answer, and negative first q-a pairs containing a first answer that is not a high-quality answer.

8. The method according to claim 7, wherein the identifying the plurality of the first questions that are similar to the second question further comprises considering only first questions that are part of the positive first q-a pairs.

9. The method according to claim 1, further comprising:
   using textual features and non-textual features for determining linking features between the first q-a pairs and the second q-a pairs, said textual features being selected from a set comprising:
   question and answer term frequency;
   novel word term frequency; or
   a number of words that the question and answer have in common; and
   said non-textual features being selected from a set comprising:
   a raw length of the question and answer;
   a ratio of question raw length to answer raw length;
   a number of answers that the question received;
   answer position in a q-a thread;
   a number of votes marking an answer as good;
   a number of votes marking an answer as bad;
   a rating that the asker of the question assigned to the answer; or
   a time span between when the question was posted and the latest answer.

10. The method according to claim 1, further comprising:
    receiving the second question from a first user of a first computer in communication with the first CQA server via a network;
    receiving the candidate second answers from one or more second users of one or more second computers in communication with the first CQA server, wherein the second question and the candidate second answers comprise a query thread selected by the first CQA server for determining which answer among the candidate second answers is the best answer; and presenting the selected best answer to users of the CQA site along with an indication that the selected second answer has been selected as the best answer.

11. One or more processor-readable storage mediums storing processor-readable program code, said processor-readable program code implemented at least in part by one or more processors for implementing the method of claim 1.

12. A system comprising:
a first community question-answer (CQA) server configured for communication with a plurality of client computers via a network, wherein the first CQA server is further configured to:
obtain a plurality of first questions and corresponding first answers as a plurality of first question-answer (q-a) pairs;
select a second question and a plurality of candidate second answers received from the client computers as a plurality of candidate second question-answer (q-a) pairs for determination of a best answer to the second question;
identify a set of the first questions that are similar to the second question;
determine first linking features between the identified set of first questions and the corresponding first answers;
determine second linking features between the second question and each of the second candidate answers; and
predict a likelihood of analogous linking features between the first linking features and the second linking features for selecting a best answer to the second question from the candidate second answers.

13. The system according to claim 12, further comprising:
a second CQA server connected for communication with said first CQA, said second CQA server containing a question-answer database, wherein said first CQA server is configured to extract at least some of the first q-a pairs from the second CQA server.

14. The system according to claim 12, further comprising:
a memory at the first CQA server, said memory storing a knowledge base comprised of the obtained first q-a pairs.

15. The system according to claim 12, wherein the first CQA server is further configured to create a link prediction model from the plurality of first q-a pairs and apply the link prediction model in combination with the first linking features to predict a likelihood of the second linking features being analogous to the first linking features.

16. The method according to claim 15, wherein the first CQA server is further configured to rank the candidate second answers according to the predicted likelihood that a second q-a pair formed from the second question and a particular candidate second answer has second linking features analogous to the first linking features.

17. The system according to claim 12, wherein the first CQA server is further configured to collect both positive first q-a pairs containing a first answer previously identified as a high-quality answer, and negative first q-a pairs containing a first answer that is not a high-quality answer when obtaining the first q-a pairs.

18. One or more processor-readable storage mediums storing processor-readable program code implemented at least in part by one or more processors for executing acts comprising:
providing a community question-answer (CQA) application for presenting a CQA website implemented at a first CQA server;
obtaining a plurality of positive first question-answer (q-a) pairs, each positive first q-a pair containing a first question and a first answer previously identified as a high-quality answer, and a plurality of negative first q-a pairs, each negative first q-a pair containing a first question and a first answer that is not a high-quality answer;
storing the plurality of positive and negative first q-a pairs in a knowledge base on a memory at the first CQA server;
creating a link prediction model from the plurality of positive and negative first q-a pairs;
receiving a second question from a first computer in communication with the first CQA server;
receiving a plurality of candidate second answers from one or more second computers in communication with the first CQA server in response to the second question;
identifying a set of the first questions that are similar to the second question by considering only the first questions that are part of the positive first q-a pairs;
determining first linking features between the identified set of first questions and the corresponding first answers making up each first q-a pair in the identified set;
identifying a plurality of candidate second q-a pairs, each comprising the second question and one of the candidate second answers;
determining second linking features between the second question and each of the candidate second answers for each candidate second q-a pair;
using the link prediction model in combination with the first linking features for determining a likelihood of the second linking features of each candidate second q-a pair being analogous to the first linking features;
obtaining a score for each candidate second q-a pair based upon the determined likelihood;
ranking the candidate second q-a pairs according to the scores; and
selecting the candidate second q-a pair having a score indicating a highest probability of analogy to the first linking features as containing a best answer.

19. The one or more processor-accessible storage mediums according to claim 18, further comprising:
marking the selected second candidate answer determined to be the best answer and presenting the selected second candidate answer as the best answer to users of the CQA website in conjunction with the second question.

20. The one or more processor-accessible storage mediums according to claim 18, further comprising:
connecting said first CQA server with a second CQA server over a network, said second CQA server containing a question-answer database, wherein the obtaining the first q-a pairs comprises extracting at least some of the first q-a pairs from the second CQA server over the network.

* * * * *